(12) United States Patent
Mikrut

(10) Patent No.: US 7,032,472 B2
(45) Date of Patent: Apr. 25, 2006

(54) COUNTERBALANCE FOR LINKAGE ASSEMBLY

(75) Inventor: Daniel L. Mikrut, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 547 days.

(21) Appl. No.: 10/143,205

(22) Filed: May 10, 2002

(65) Prior Publication Data

US 2003/0218361 A1 Nov. 27, 2003

(51) Int. Cl.
*G05G 1/00* (2006.01)

(52) U.S. Cl. .................. 74/470; 74/380; 74/388 R

(58) Field of Classification Search .............. 74/470, 74/380, 388 R

See application file for complete search history.

(56) References Cited

U.S. PATENT DOCUMENTS

| 4,068,876 | A | | 1/1978 | Muellner | |
|---|---|---|---|---|---|
| 4,573,308 | A | | 3/1986 | Ehrecke et al. | |
| 4,878,802 | A | | 11/1989 | Hansen et al. | |
| 5,210,997 | A | * | 5/1993 | Mountcastle, Jr. | 56/15.2 |
| 6,035,478 | A | | 3/2000 | Miller et al. | |
| 6,109,676 | A | | 8/2000 | Avis et al. | |
| 6,250,055 | B1 | | 6/2001 | Franet | |
| 6,276,424 | B1 | * | 8/2001 | Frey, Jr. | 160/67 |
| 6,341,809 | B1 | | 1/2002 | Chapman | |
| 2002/0092101 | A1 | * | 7/2002 | Lounsbury et al. | 14/71.1 |

* cited by examiner

*Primary Examiner*—David Fenstermacher

(57) ABSTRACT

An apparatus and method for providing a counterbalance for a linkage assembly. The apparatus and method includes a frame, at least one linkage movably connected to the frame, the at least one linkage defining the linkage assembly, at least one actuator for moving the linkage assembly, and an energy storing device connected to the frame and engaged by the linkage assembly, wherein the energy storing device stores energy from the linkage assembly during engagement and provides the stored energy to counterbalance the weight of the linkage assembly.

20 Claims, 8 Drawing Sheets

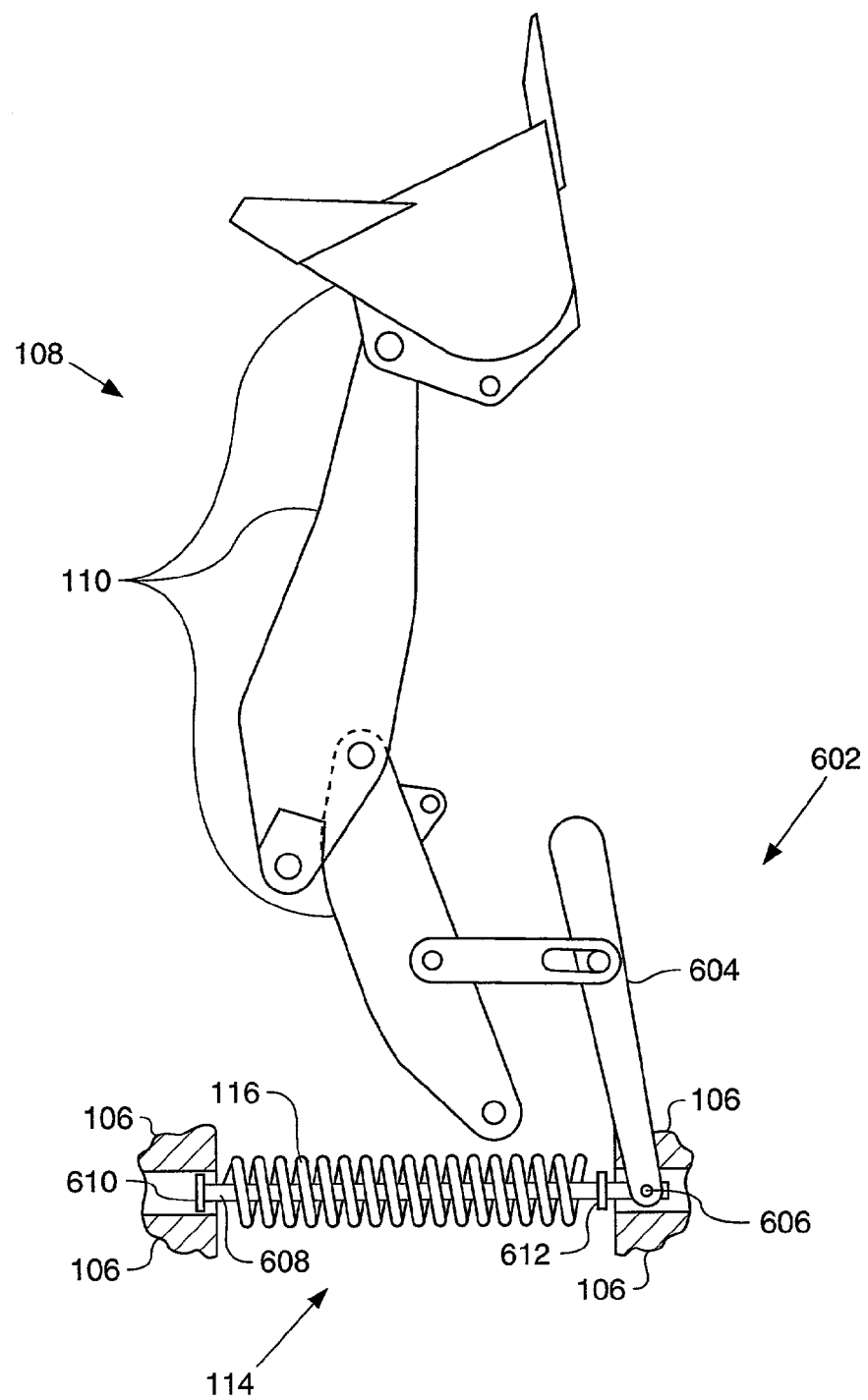

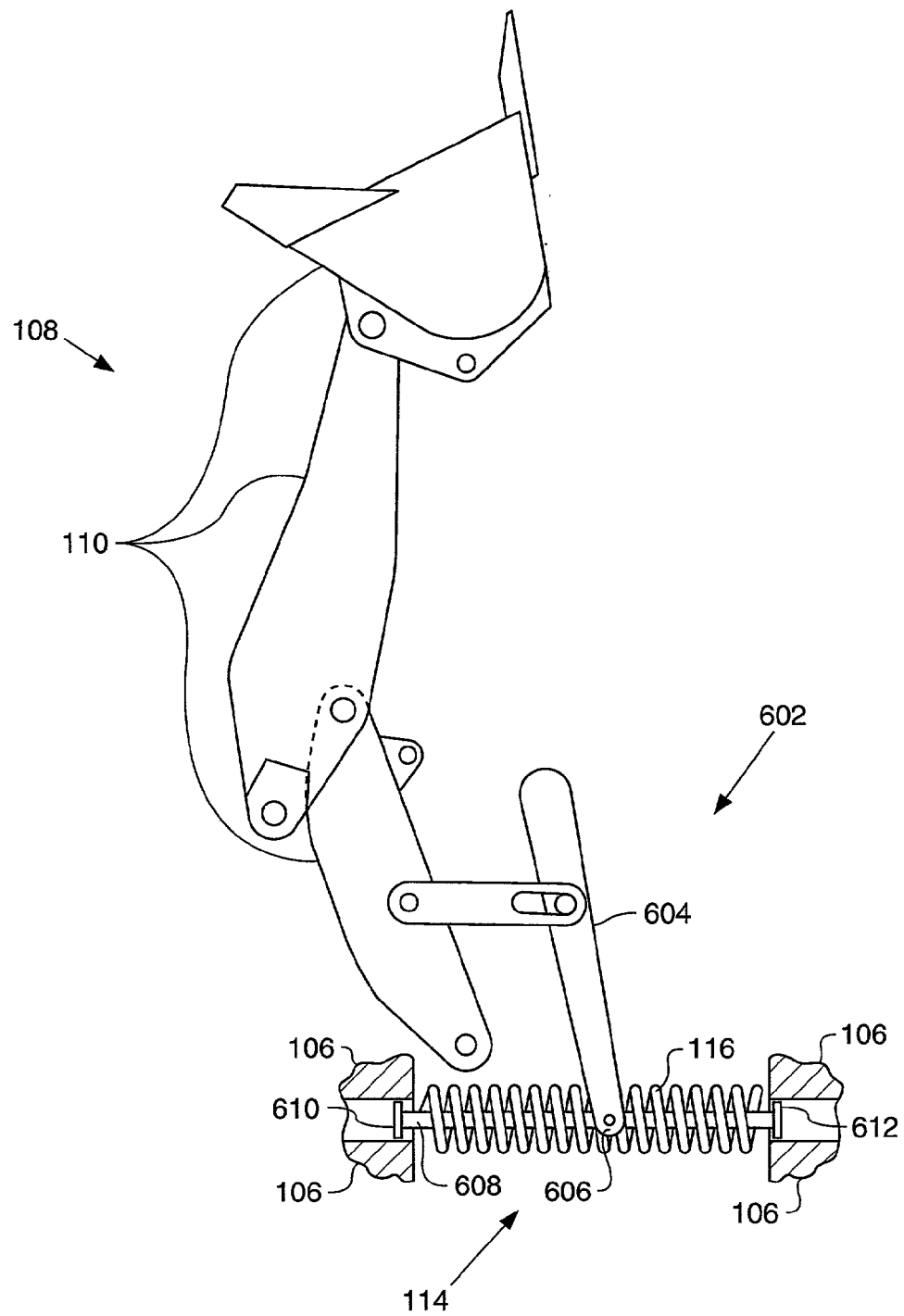

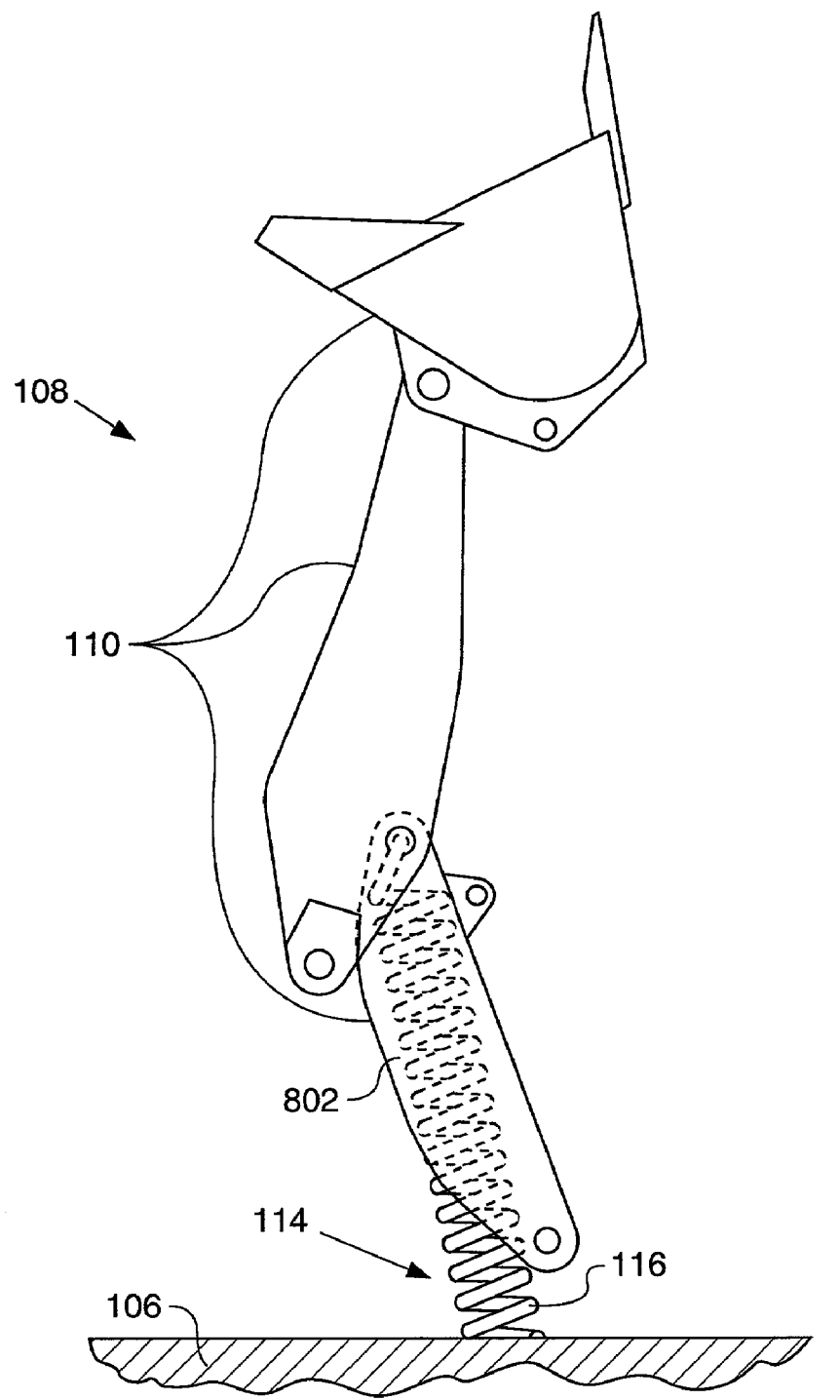
Fig_8_

US 7,032,472 B2

COUNTERBALANCE FOR LINKAGE ASSEMBLY

TECHNICAL FIELD

This invention relates generally to an apparatus and method for providing a counterbalance for a linkage assembly and, more particularly, to an apparatus and method for storing energy during motion of the linkage assembly and using the stored energy to provide a counterbalance for the linkage assembly.

BACKGROUND

Linkage assemblies are used in a variety of applications. For example, linkage assemblies are often used to perform work of some type. In the earthworking industry, for instance, linkage assemblies are typically mounted on machines and are used to move a work implement to perform some useful function. Wheel loaders, for example, usually have a linkage assembly which is used to move a bucket for digging, hauling and dumping purposes.

Quite often, the linkage assemblies must be large and heavy to handle heavy loads. Thus, machines which use these linkage assemblies must expend great amounts of power merely to move the linkages, notwithstanding the work required to move loads. Earthworking machines, such as wheel loaders, excavators, tele-handlers, and the like, often are required to extend the linkages substantial distances vertically and outward from the machine, thus contributing by way of gravity to the severe load requirements of the linkages themselves.

The great amounts of power required just to move the linkage assemblies is considered to be wasted power. Furthermore, the machine must be designed with enough capacity to handle the required additional power outputs, thus adding to costs. In addition, the excess power required takes a toll on the machine, shortening the useful life of the machine and increasing maintenance costs.

The present invention is directed to overcoming one or more of the problems as set forth above.

SUMMARY OF THE INVENTION

In one aspect of the present invention an apparatus for providing a counterbalance for a linkage assembly is disclosed. The apparatus includes a frame, at least one linkage movably connected to the frame, the at least one linkage defining the linkage assembly, means for moving the linkage assembly, and an energy storing device connected to the frame and engaged by the linkage assembly, wherein the energy storing device stores energy from the linkage assembly during engagement and provides the stored energy to counterbalance the weight of the linkage assembly.

In another aspect of the present invention a method for providing a counterbalance for a linkage assembly is disclosed. The method includes the steps of moving the linkage assembly, engaging an energy storing device by the linkage assembly, storing energy in the energy storing device during engagement, and providing the stored energy to counterbalance the weight of the linkage assembly.

BRIEF DESCRIPTION OF THE DRAWINGS

FIG. 6 is a diagrammatic illustration of another embodiment of the present invention;

FIG. 7 is a diagrammatic illustration of another embodiment of the present invention; and FIG. 8 is a diagrammatic illustration of another embodiment of the present invention.

DETAILED DESCRIPTION

With reference to the drawings and the appended claims, an apparatus 100 and method for providing a counterbalance for a linkage assembly is disclosed.

Figure 1:
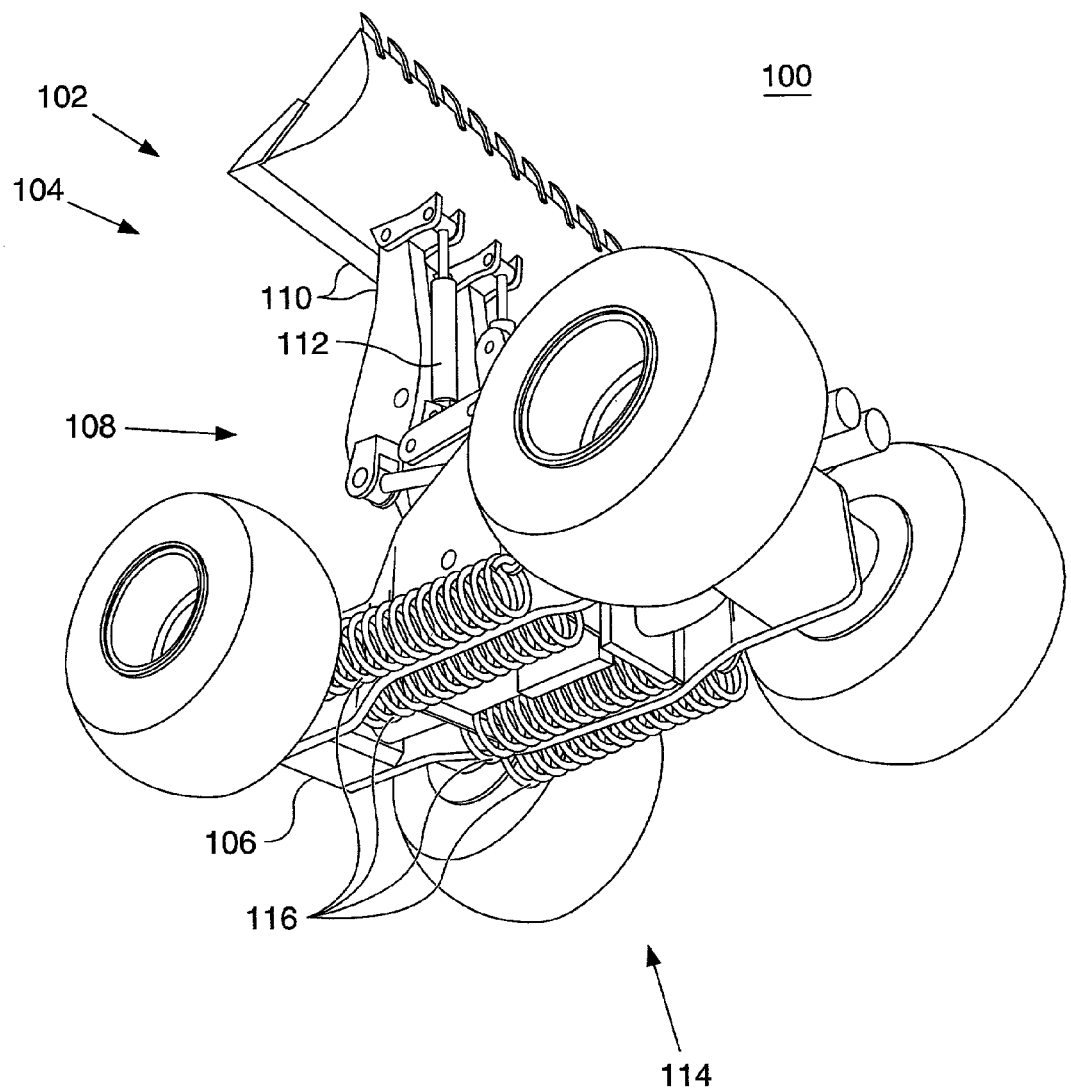
FIG. 1 is a diagrammatic illustration of a machine suited for use with the present invention.

Referring to FIG. 1, a machine 102 is shown. The machine 102 is depicted for exemplary purposes as an earthworking machine 104, more specifically a wheel loader of a unique design known as an overshot (or overhead) loader. The earthworking machine 104 of FIG. 1 is particularly well suited for use with the present invention. However, other types of earthworking machines, such as excavators, tele-handlers, front shovels, conventional type wheel loaders, track loaders, and the like, may also benefit from use of the present invention. Furthermore, other types of machines which employ a linkage assembly 108 may also be used. In particular, various types of load handling machines which use a linkage assembly 108 to handle loads may benefit from use of the present invention. Hereinafter, the term machine 102 will be used in its broadest sense to depict any one of many types of applications having a linkage assembly 104.

Figure 2:
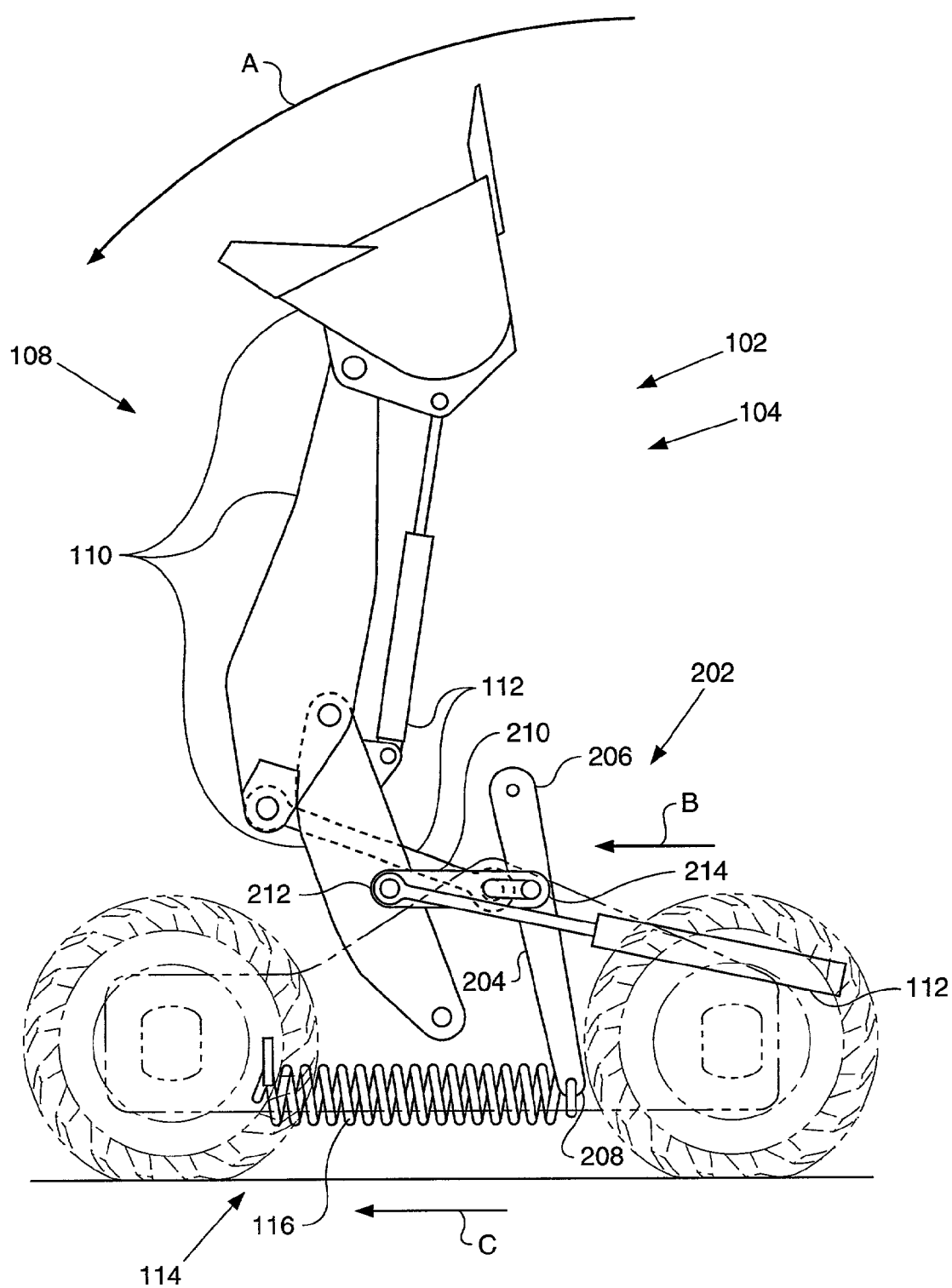
FIG. 2 is a diagram illustrating one embodiment of the present invention.

The machine 102 of FIG. 1 includes a frame 106. Typical frames include an undercarriage, chassis, support members, and the like. A linkage assembly 108 is movably connected to the frame 106. For example, as FIGS. 1 and 2 illustrate, the linkage assembly 108 includes at least one linkage 110, in this example, three. The loader machine illustrated includes a work implement, i.e., bucket, and two additional linkages 110, thus having three linkages 110 making up the linkage assembly 108. However, it is noted that any number of linkages 110, such as 1, 2 or more, may be included in the linkage assembly 108. In the example illustrated, the linkage assembly 108 pivots about the frame 106, as shown by curved arrow A in FIG. 2. Although the arrow A shows the linkage assembly 108 moving from right to left, it is noted that the linkage assembly 108 may move in the opposite direction, i.e., from left to right, as well.

Means 112 for controllably moving the linkage assembly 108 may include, as the figures illustrate, a set of cylinders, preferably hydraulically actuated. However, other means 112 for controllably moving the linkage assembly 108 may be used. For example, electrically actuated servos, pneumatic cylinders, cables and pulleys, and the like may be used to controllably move the linkage assembly 108. It is also noted that the linkages 110 of a linkage assembly 108 preferably are configured to move relative to each other, for example by pivotal movement.

The present invention includes an energy storing device 114 connected to the frame 106. In the preferred embodiment, the energy storing device 114 is engaged by the linkage assembly 108 as the linkage assembly 108 approaches a specified position. In one embodiment, the energy storing device 114 is engaged as the linkage assembly 108 approaches a raised, e.g., substantially vertical, position. In another embodiment, the energy storing device 114 is engaged as the linkage assembly 108 approaches a lowered, e.g., substantially horizontal, position. However, the energy storing device 114 may be configured to be engaged by the linkage assembly 108 in any number of other positions of the linkage assembly 108 as desired.

In the preferred embodiment, the energy storing device 114 includes at least one spring 116. For example, FIG. 1 illustrates a set of four springs 116 connected to the frame 106 and operating in parallel with each other. Preferably, the springs 116 store energy from the linkage assembly 108 as they are compressed. The stored energy is then used to counterbalance the weight of the linkage assembly 108, as is described in more detail below. It is noted that the energy storing device 114 may include some other type of components. For example, pneumatic cylinders, e.g., gas springs, or some other type of energy storing device could be used as well.

Figure 3:
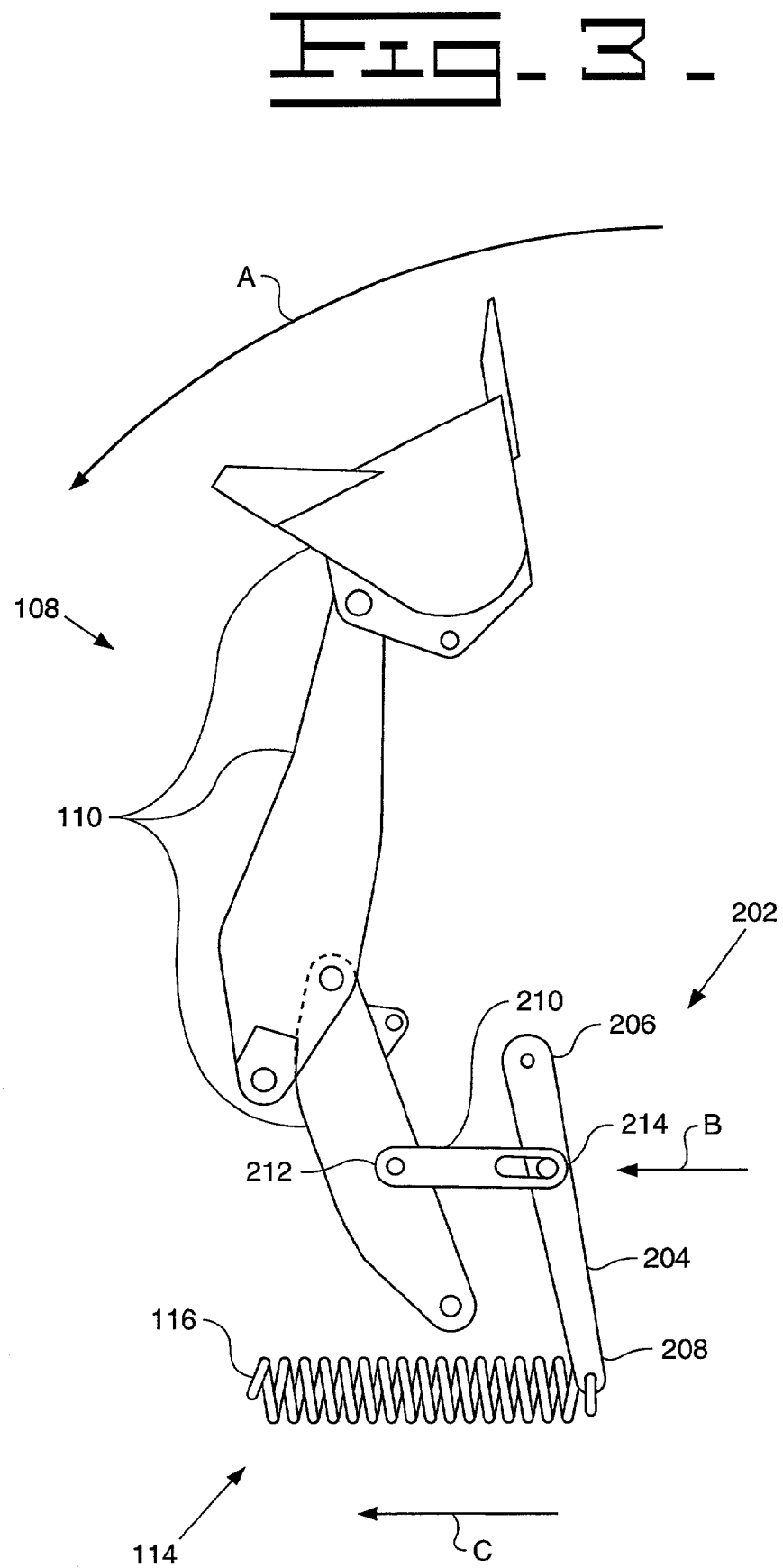
FIG. 3 is a diagram illustrating a portion of the embodiment of FIG. 2.

Referring to FIG. 3, a diagrammatic illustration of a portion of the assembly of FIGS. 1 and 2 is shown. The illustration of FIG. 3 depicts a preferred embodiment of the present invention. More specifically, the embodiment of FIG. 3 illustrates use of the energy storing device 114 as the linkage assembly 108 approaches a raised position.

A lift position engaging assembly 202 engages the energy storing device 114 as the linkage assembly 108 approaches the raised position. In the example embodied by the figures, i.e., an overshot loader, the linkage assembly 108 is lifting over the machine 102 during a transition from a dig operation to a dump operation. The movement of the linkage assembly 108 is shown by curved arrow A. As the linkage assembly 108 approaches the raised, i.e., substantially vertical, position, it is desired to provide a counterbalance to the weight of the linkage assembly 108, thus reducing the power required by the machine 102 and also reducing the required mass and size of the machine 102 to accommodate the weight of the linkage assembly 108. The lift position engaging assembly 202 provides an interface between the linkage assembly 108 and the energy storing device 114.

The lift position engaging assembly 202 includes a pivot assembly 204. The pivot assembly 204 has a first end 206 pivotally connected to the frame 106 and a second end 208 in engaged contact with the energy storing device 114. The lift position engaging assembly 202 also includes a slide bar 210. The slide bar 210 has a first end 212 connected to the linkage assembly 108 and a second end 214 slidably connected to the pivot assembly 204.

In operation, as the linkage assembly 108 moves from right to left, as denoted by arrow A, the slide bar 210 also moves from right to left. At a designated position, the slide bar 210 engages the pivot assembly 204 and pulls the pivot assembly 204 from right to left, as denoted by arrow B. The first end 206 of the pivot assembly 204 pivots about its connection point to the frame 106 and the second end 208 of the pivot assembly 204 moves from right to left, thus compressing the energy storing device 114, as denoted by arrow C. The compression of the energy storing device 114 stores energy, which acts to push back against the lift position engaging assembly 202 and subsequently the linkage assembly 108. This reaction force against the linkage assembly 108 provides a counterbalance to the weight of the linkage assembly 108 as the linkage assembly 108 is in the raised position. The counterbalance serves to provide a force which helps the linkage assembly 108 return from the raised position to its original lowered position, i.e., to move from left to right.

Figure 4:
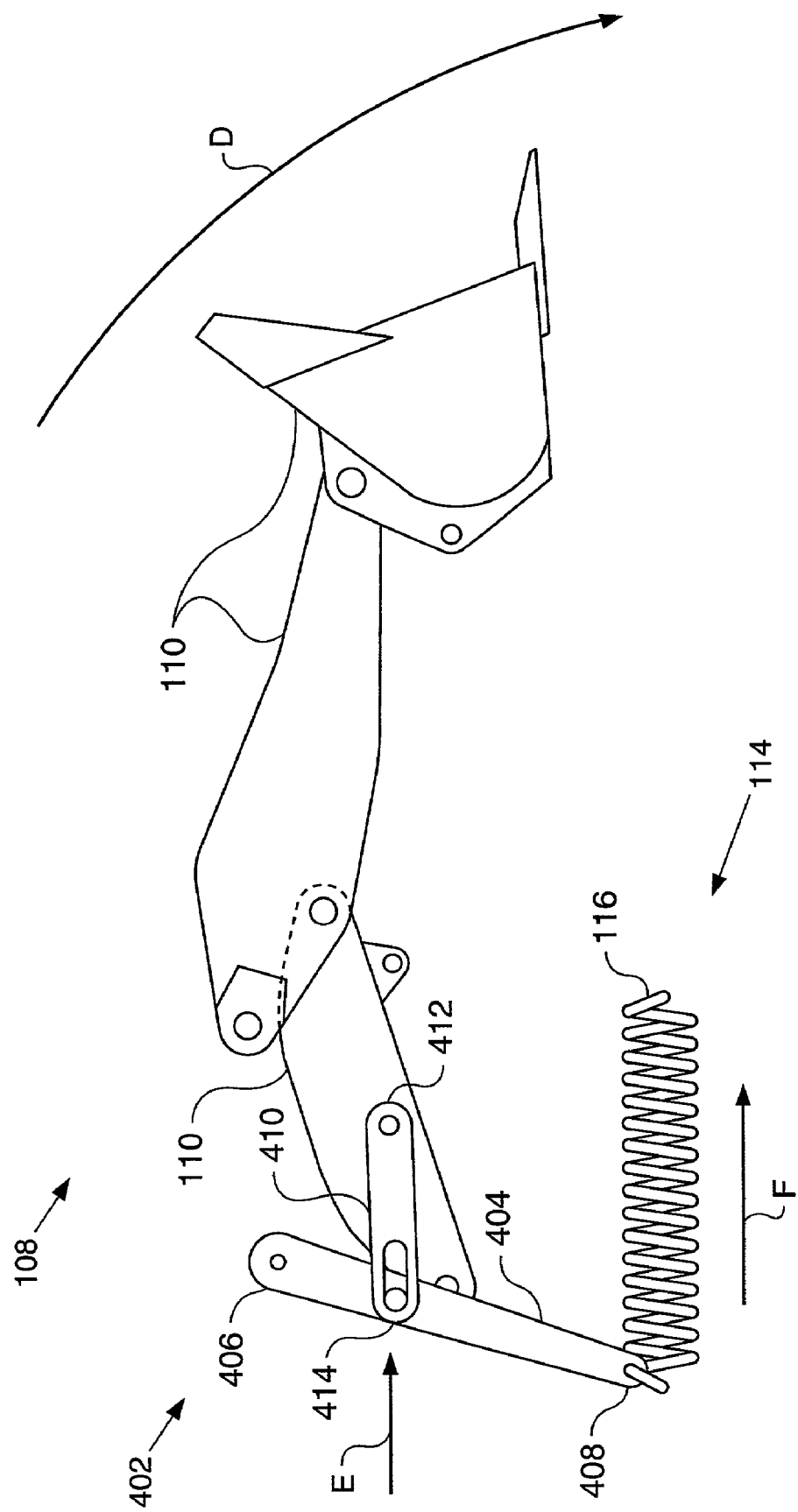
FIG. 4 is a diagram illustrating another embodiment of the present invention.

Referring to FIG. 4, a further diagrammatic illustration of a portion of the assembly of FIGS. 1 and 2 is shown. The illustration of FIG. 4 depicts an alternate embodiment of the present invention. More specifically, the embodiment of FIG. 4 illustrates use of the energy storing device 114 as the linkage assembly 108 approaches a lowered position.

A lower position engaging assembly 402 engages the energy storing device 114 as the linkage assembly 108 approaches the lowered position. In the example embodied by the figures, i.e., an overshot loader, the linkage assembly 108 is lowering toward the ground during a transition from a dump operation to a dig operation. More specifically, the linkage assembly 108 is lowering to a substantially horizontal position near the ground in preparation for a dig function. The movement of the linkage assembly 108 is shown by curved arrow D. As the linkage assembly 108 approaches the lowered, i.e., substantially horizontal, position, it is desired to provide a counterbalance to the weight of the linkage assembly 108, thus reducing the power required by the machine 102 and also reducing the required mass and size of the machine 102 to accommodate the weight of the linkage assembly 108. The counterbalance in effect helps the linkage assembly 108 to "float" near the surface of the ground. The lower position engaging assembly 402 provides an interface between the linkage assembly 108 and the energy storing device 114.

The lower position engaging assembly 402 includes a pivot assembly 404. The pivot assembly 404 has a first end 406 pivotally connected to the frame 106 and a second end 408 in engaged contact with the energy storing device 114. The lower position engaging assembly 402 also includes a slide bar 410. The slide bar 410 has a first end 412 connected to the linkage assembly 108 and a second end 414 slidably connected to the pivot assembly 404.

In operation, as the linkage assembly 108 moves from left to right, as denoted by arrow D, the slide bar 410 also moves from left to right. At a designated position, the slide bar 410 engages the pivot assembly 404 and pulls the pivot assembly 404 from left to right, as denoted by arrow E. The first end 406 of the pivot assembly 404 pivots about its connection point to the frame 106 and the second end 408 of the pivot assembly 404 moves from left to right, thus compressing the energy storing device 114, as denoted by arrow F. The compression of the energy storing device 114 stores energy, which acts to push back against the lower position engaging assembly 402 and subsequently the linkage assembly 108. This reaction force against the linkage assembly 108 provides a counterbalance to the weight of the linkage assembly 108 as the linkage assembly 108 is in the lowered position.

Figure 5:
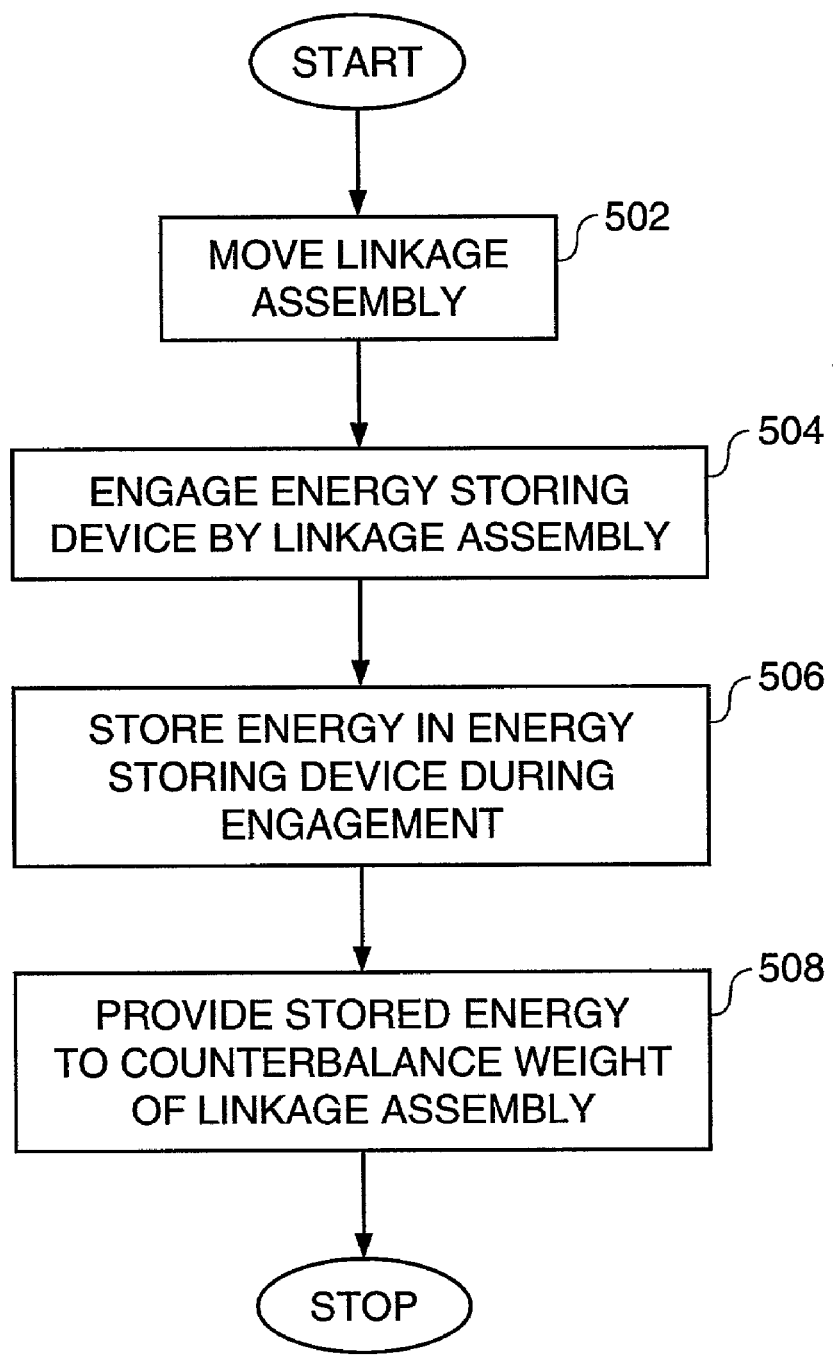
FIG. 5 is a flow diagram illustrating a preferred method of the present invention.

Referring to FIG. 5, a flow diagram illustrating a preferred method of the present invention is shown. The flow diagram describes the steps performed as the linkage assembly 108 is moved. However, the steps may also be modified and applied to the linkage assembly 108 specifically approaching either a raised or a lowered position as well, or any other position in which it may be desired to provide a counterbalance.

In a first control block 502, the linkage assembly 108 is controllably moved, for example by a human operator or via automation. In the example of an earthworking machine 104, movement of the linkage assembly 108 may be controlled by electro-hydraulic actuators, which in turn control the actuation of hydraulic cylinders which move the various linkages 110.

In a second control block 504, the energy storing device 114 is engaged by the linkage assembly 108. Preferably, the energy storage device 114 includes one or more springs 116 which are compressed as the linkage assembly 108 is moved.

In a third control block 506, energy is stored in the energy storage device 114 during engagement. Control then proceeds to a fourth control block 508, in which the stored energy is provided to counterbalance the weight of the linkage assembly 108.

FIGS. 6–8 illustrate various additional embodiments which may be used in the present invention.

In FIG. 6, the energy storing device 114 is positioned such that the frame 106 confines movement of the energy storing device 114 at both ends. In the embodiment shown, a spring engaging assembly 602 includes a spring engaging bar 604. An engaging end 606 of the spring engaging bar 604 is connected to an inner spring rod 608, which is positioned through the center of the spring 116. A first inner spring rod end 610 pulls the spring 116 from left to right as the spring engaging bar 604 moves from left to right. A second inner spring rod end 612 pulls the spring 116 from right to left as the spring engaging bar 604 moves from right to left. Thus, the spring 116 is compressed either to the left or to the right as the linkage assembly 108 correspondingly moves either to the left or to the right. Alternatively, the linkage assembly 108 may directly engage the energy storing device 114, thus removing the need for the spring engaging assembly 602.

A variation of the embodiment of FIG. 6 is shown in FIG. 7. The engaging end 606 of the spring engaging bar 604 is connected to the inner spring rod 608 at some point between the first and second inner spring rod ends 610,612. Although the engaging end 606 of the spring engaging bar 604 is shown at a point about halfway between the ends of the spring 116, the connection point may be at any location along the spring 116 to achieve desired compression characteristics in both directions. Once again, the linkage assembly 108 may be configured to engage the spring 116 directly, thus removing the need for the spring engaging assembly 602.

FIG. 8 depicts yet another embodiment in which the energy storing device 114 is located within a hollow portion 802 of the linkage assembly 108 and is connected at one end to the frame 106. During movement of the linkage assembly 108 relative to the frame 106, the energy storing device 114 stores energy. The stored energy is then used to counterbalance the weight of the linkage assembly 108.

INDUSTRIAL APPLICABILITY

As an example of an application of the present invention, the figures depict an earthworking machine 104 commonly known as an overshot, or overhead loader. Although these machines are not commonly used, the machine 102 shown in the figures represents an autonomous overshot loader. In principle, the machine 102 digs material at one end of the machine 102, lifts the material via the linkage assembly 108 over the machine 102, and dumps the material, e.g., into a truck, at the other end of the machine 102, thus expediting the dig and dump process. It is desired to design and build the machine 102 to minimize the power required to operate. Thus, the machine 102 is designed to be fairly light in weight, yet sturdy enough for harsh work environments.

One method of keeping the power requirements down is to store energy expended by the movement of the linkage assembly 108 during movement between dig and dump positions, and to use the stored energy to counterbalance the weight of the linkage assembly 108 at strategic positions. For example, as the linkage assembly 108 moves toward a raised position to dump a load of material, energy may be stored in the energy storing device 114. The stored energy may then be expended to counterbalance the weight of the raised linkage assembly 108 and help return the linkage assembly 108 to a dig position. In like manner, as the linkage assembly 108 approaches a lowered position, i.e., toward the ground for a dig operation, energy may once again be stored in the energy storing device 114. The stored energy may then be used to counterbalance the weight of the linkage assembly 108, in effect causing the linkage assembly 108 to "float" near the ground.

The present invention may also be used with other types of machines having movable linkage assemblies. For example, the present invention may also be used with other types of earthworking machines, such as wheel loaders, tele-handlers, excavators, front shovels, track shovels, and the like.

Other aspects, objects, and features of the present invention can be obtained from a study of the drawings, the disclosure, and the appended claims.

What is claimed is:

1. An apparatus for providing a counterbalance for a linkage assembly, comprising:
    a load handling machine with a frame that includes a chassis;
    at least one load handling linkage movably connected to the frame, the at least one linkage defining the linkage assembly;
    means for controllably moving the linkage assembly;
    an energy storing device connected to the frame and engaged by the linkage assembly as the linkage assembly approaches a raised position; and
    a lift position engaging assembly for engaging the energy storing device by the linkage assembly, the lift position engaging assembly including:
        a pivot assembly having a first end pivotally connected to the frame and a second end in engaged contact with the energy storing device; and
        a slide bar having a first end connected to the linkage assembly and a second end slidably connected to the pivot assembly;
    wherein the energy storing device stores energy from the linkage assembly during engagement and provides the stored energy to counterbalance the weight of the linkage assembly.

2. An apparatus, as set forth in claim 1, wherein the energy storing device includes at least one spring.

3. An apparatus, as set forth in claim 2, wherein the at least one spring is configured to store energy during compression.

4. A work machine comprising:
    a chassis;
    a linkage assembly, which includes a bucket, connected to the chassis;
    at least one actuator operably coupled to the linkage assembly to move the bucket with respect to the chassis; and
    an energy storing device connected to the chassis and engaged by the linkage assembly via an engaging assembly, and the energy storing device including at least one spring.

5. The work machine of claim 4 wherein the at least one actuator includes a plurality of hydraulic actuators.

6. The work machine of claim 4, wherein the energy storing device is continuously engaged by the linkage assembly throughout its range of motion.

7. The work machine of claim 4, wherein the engaging assembly engages the energy storing device with the linkage assembly across a portion of a range of motion of the linkage assembly less than its full range of motion.

8. The work machine of claim 7, wherein the energy storing device is engaged by the linkage assembly as the linkage assembly approaches a raised position.

9. The work machine of claim 7, wherein the energy storing device is engaged by the linkage assembly as the linkage assembly approaches a lowered position but not as the linkage assembly approaches a raised position.

10. The work machine of claim 9, further including a lower position engaging assembly for engaging the energy storing device by the linkage assembly.

11. The work machine of claim 4 includes a pivot assembly having a first end pivotally connected to the chassis and a second end in engaged contact with the energy storing device; and
a slide bar having a first end connected to the linkage assembly and a second end slidably connected to the pivot assembly.

12. The work machine of claim 4 wherein the spring includes a plurality of mechanical springs mounted adjacent an underside of the chassis.

13. The work machine of claim 4, wherein the work machine is a front wheel loader.

14. The work machine of claim 4, wherein the at least one actuator includes a plurality of hydraulic actuators; the spring includes a plurality of mechanical springs mounted adjacent an underside of the chassis; and
the work machine is a front wheel loader.

15. A method of operating a work machine, comprising the steps of:
moving a bucket of a linkage assembly with respect to a chassis with an actuator;
engaging an energy storing device with an engaging assembly during at least a portion of the moving step; and
counterbalancing a weight of the linkage assembly with the energy storing device.

16. The method of claim 15 including a step of disengaging the energy storing device from the linkage assembly over a portion of its range of motion.

17. The method of claim 16 wherein the disengaging step includes a step of disengaging the energy storing device from the linkage assembly between a raised position and a lowered position thereof.

18. The method of claim 15 wherein the engaging step includes compressing a spring.

19. The method of claim 15 wherein engaging step includes the step of engaging the energy storing device as the linkage assembly approaches a raised position.

20. The method of claim 15 wherein engaging step includes the step of engaging the energy storing device as the linkage assembly approaches a lowered position.

* * * * *